(12) United States Patent
Maeno

(10) Patent No.: US 11,858,069 B2
(45) Date of Patent: Jan. 2, 2024

(54) ELONGATE PROFILE, AN ASSEMBLY COMPRISING THE ELONGATE PROFILE AND A METHOD FOR PRODUCING THE ELONGATE PROFILE

(71) Applicant: Cutwork B.V., Amsterdam (NL)

(72) Inventor: Antonin Yuji Maeno, Amsterdam (NL)

(73) Assignee: CUTWORK B.V., Amsterdam (NL)

( * ) Notice: Subject to any disclaimer, the term of this patent is extended or adjusted under 35 U.S.C. 154(b) by 590 days.

(21) Appl. No.: 16/760,673

(22) PCT Filed: Oct. 30, 2018

(86) PCT No.: PCT/NL2018/050720
§ 371 (c)(1),
(2) Date: Apr. 30, 2020

(87) PCT Pub. No.: WO2019/088828
PCT Pub. Date: May 9, 2019

(65) Prior Publication Data
US 2020/0353569 A1    Nov. 12, 2020

(30) Foreign Application Priority Data
Oct. 30, 2017 (NL) .................................. 2019828

(51) Int. Cl.
*F16L 9/18* (2006.01)
*B23K 26/38* (2014.01)
(Continued)

(52) U.S. Cl.
CPC ................ *B23K 26/38* (2013.01); *E04C 3/00* (2013.01); *F16L 9/003* (2013.01);
(Continued)

(58) Field of Classification Search
CPC .............. F16L 9/003; F16S 3/00; B26D 3/10
(Continued)

(56) References Cited

U.S. PATENT DOCUMENTS

| 113,614 A | * | 4/1871 | Austin | B21D 11/08 |
| | | | | 285/183 |
| 1,513,100 A | * | 10/1924 | Frederick | B23D 21/02 |
| | | | | 83/917 |

(Continued)

FOREIGN PATENT DOCUMENTS

| EP | 2103504 A1 | 9/2009 |
| ER | 2982181 A1 | 5/2013 |

OTHER PUBLICATIONS

Search Report from corresponding Dutch Application No. 2019828, dated Jun. 19, 2018.

(Continued)

*Primary Examiner* — James F Hook
(74) *Attorney, Agent, or Firm* — Workman Nydegger

(57) ABSTRACT

The invention relates to an elongate profile extending in a longitudinal direction and having a first end and a second end, wherein between the first end and the second end the profile has at least one cutting line forming a cutting pattern for at least one profile section to be removed from the profile, wherein after removal of the at least one profile section from the profile the first end of the profile is bendable towards the second end of the profile and/or vice versa.

20 Claims, 9 Drawing Sheets

(51) Int. Cl.
*F16L 25/00* (2006.01)
*F16S 3/00* (2006.01)
*F16S 5/00* (2006.01)
*E04C 3/00* (2006.01)
*F16L 9/00* (2006.01)
*B26D 3/16* (2006.01)
*B26D 3/08* (2006.01)
*B26D 3/10* (2006.01)

(52) U.S. Cl.
CPC ............ *F16L 25/0009* (2013.01); *F16S 3/00* (2013.01); *F16S 5/00* (2013.01); *B26D 3/08* (2013.01); *B26D 3/10* (2013.01); *B26D 3/167* (2013.01)

(58) Field of Classification Search
USPC .......................................... 138/119, 177, 178
See application file for complete search history.

(56) References Cited

U.S. PATENT DOCUMENTS

| | | | | | |
|---|---|---|---|---|---|
| 1,668,953 | A | * | 5/1928 | Erickson | H02G 3/0487 174/101 |
| 1,694,430 | A | * | 12/1928 | Root | D21J 7/00 138/145 |
| 1,856,375 | A | * | 5/1932 | Cohen | G09F 5/042 206/487 |
| 4,580,551 | A | * | 4/1986 | Siegmund | A61B 1/0055 600/139 |
| 4,694,547 | A | * | 9/1987 | Broussard | F16L 59/11 285/47 |
| 5,235,964 | A | * | 8/1993 | Abenaim | A61B 1/00135 600/462 |
| 5,381,782 | A | * | 1/1995 | DeLaRama | A61B 1/0056 604/95.01 |
| 6,012,494 | A | * | 1/2000 | Balazs | B25J 18/06 138/119 |
| 2008/0257440 | A1 | * | 10/2008 | Ikeda | F16G 13/16 138/119 |
| 2012/0138185 | A1 | * | 6/2012 | Tubach | B23D 23/02 72/369 |

OTHER PUBLICATIONS

International Search Report and Written Opinion from PCT Application No. PCT/NL2018/050720, dated Feb. 12, 2019.

* cited by examiner

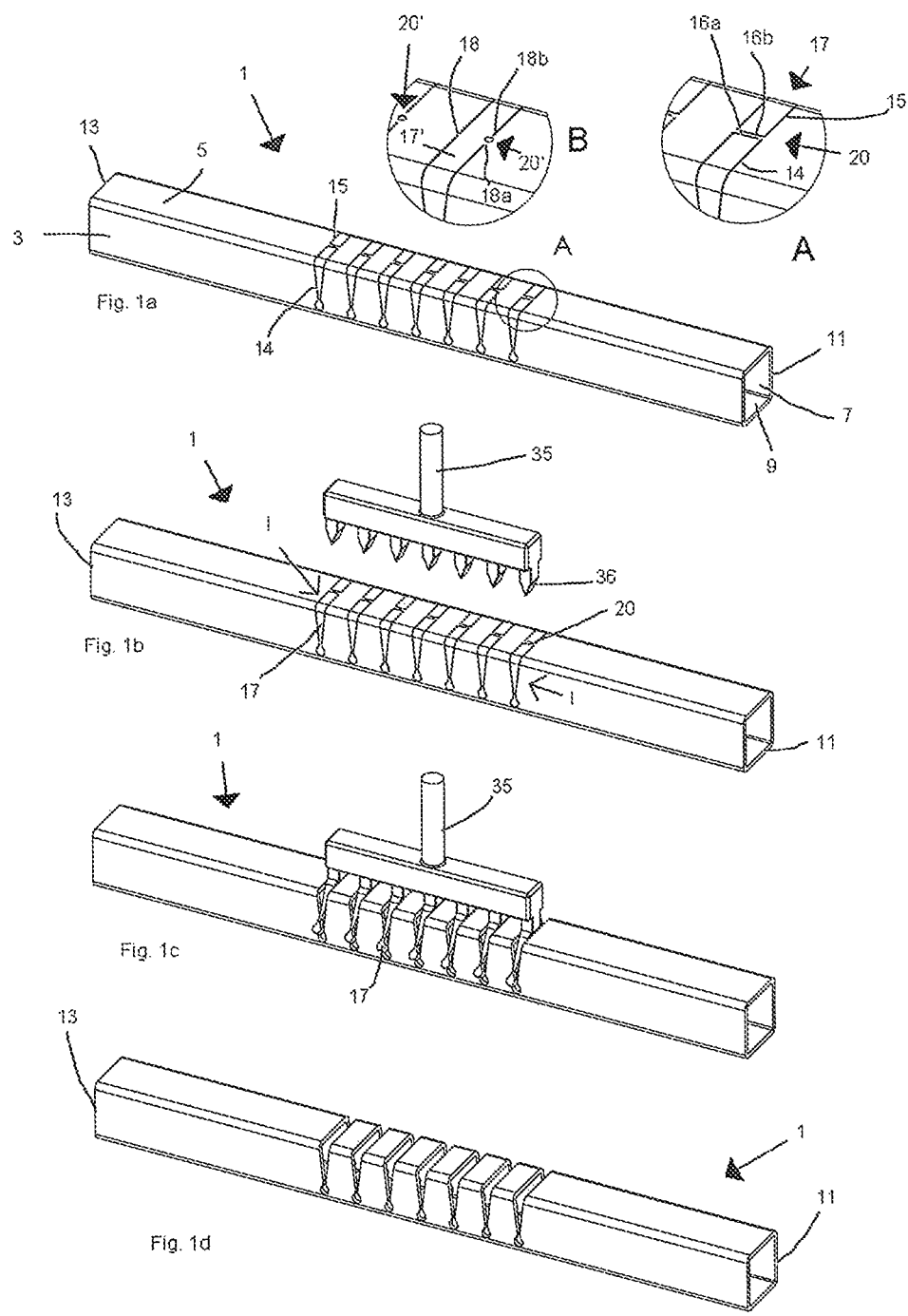

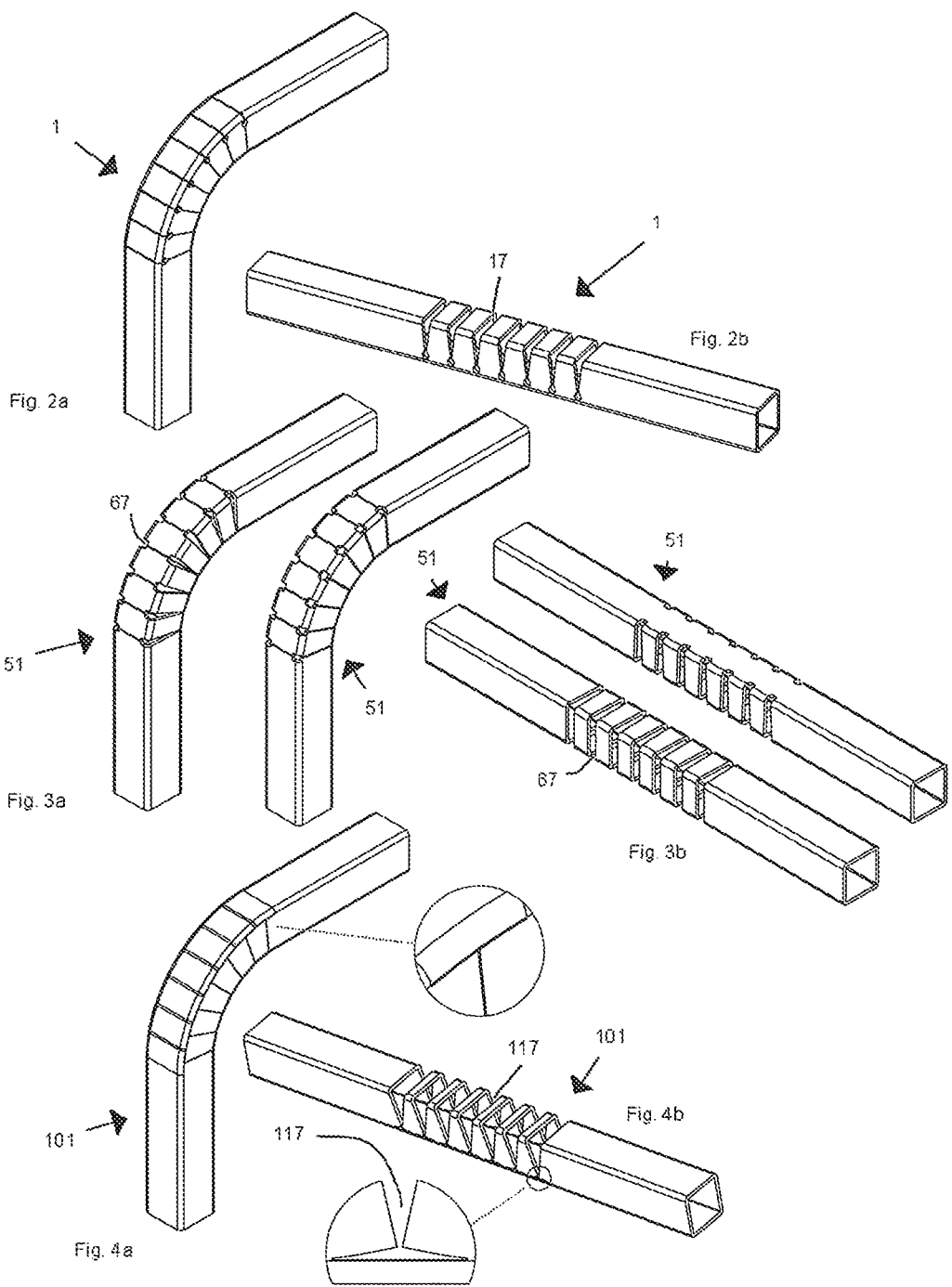

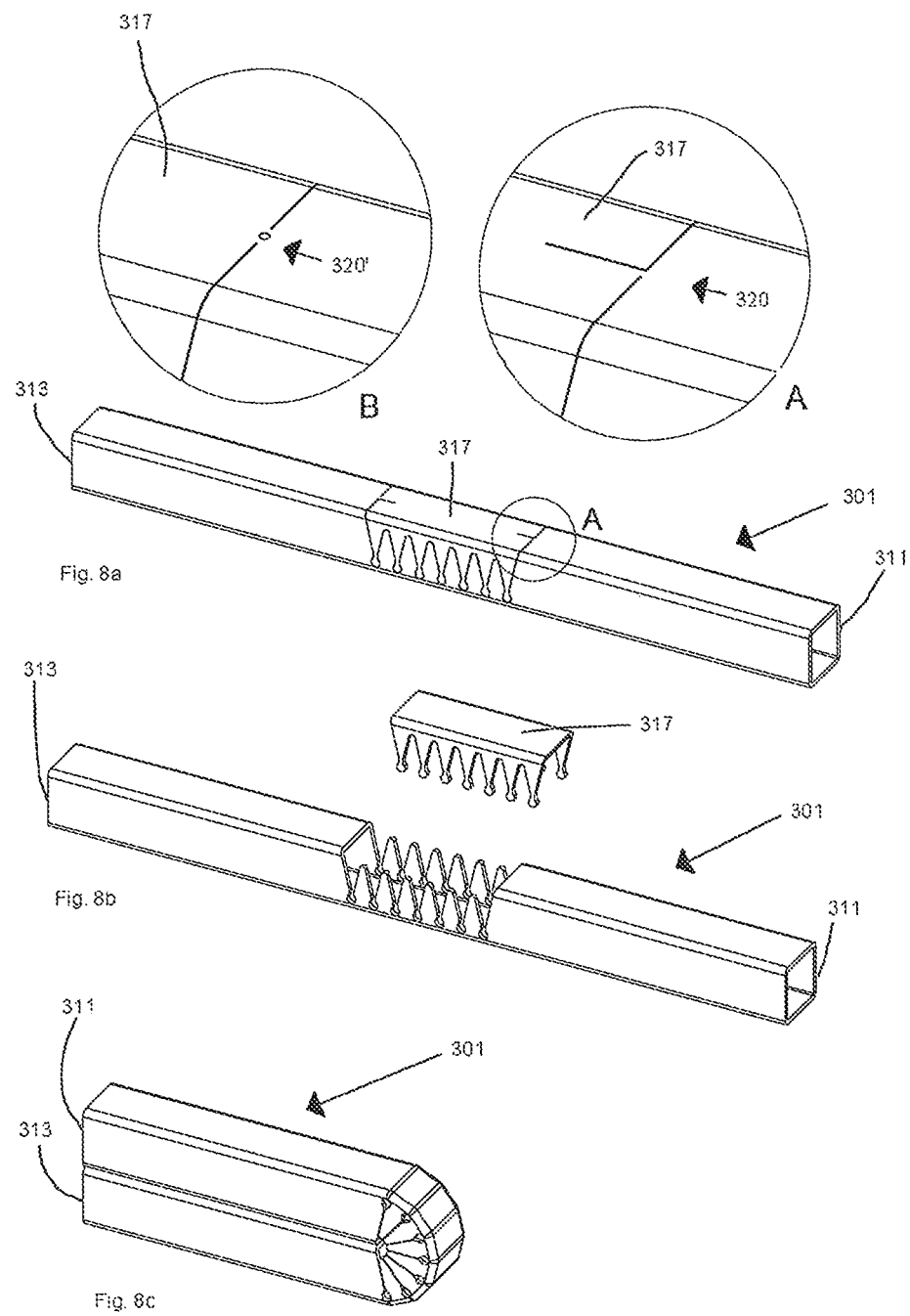

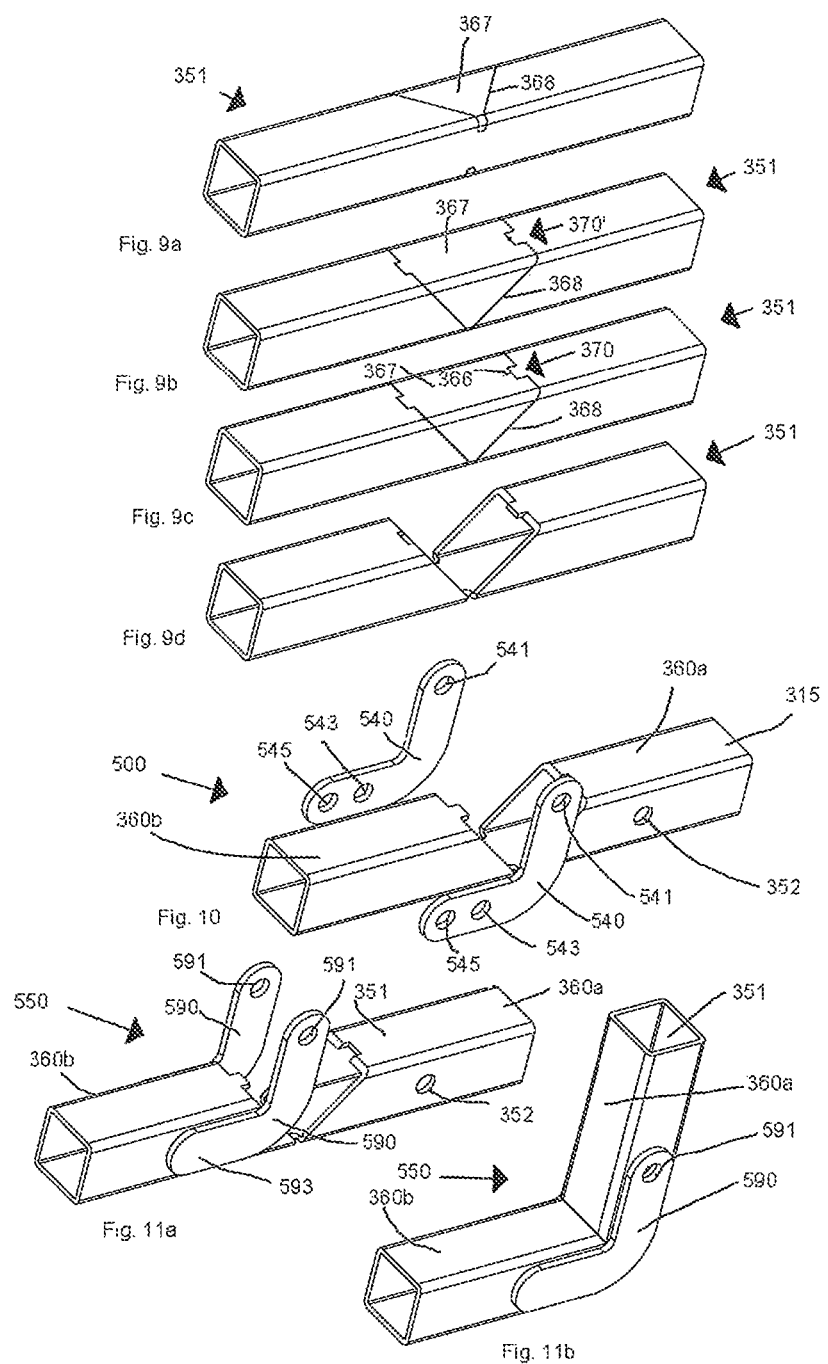

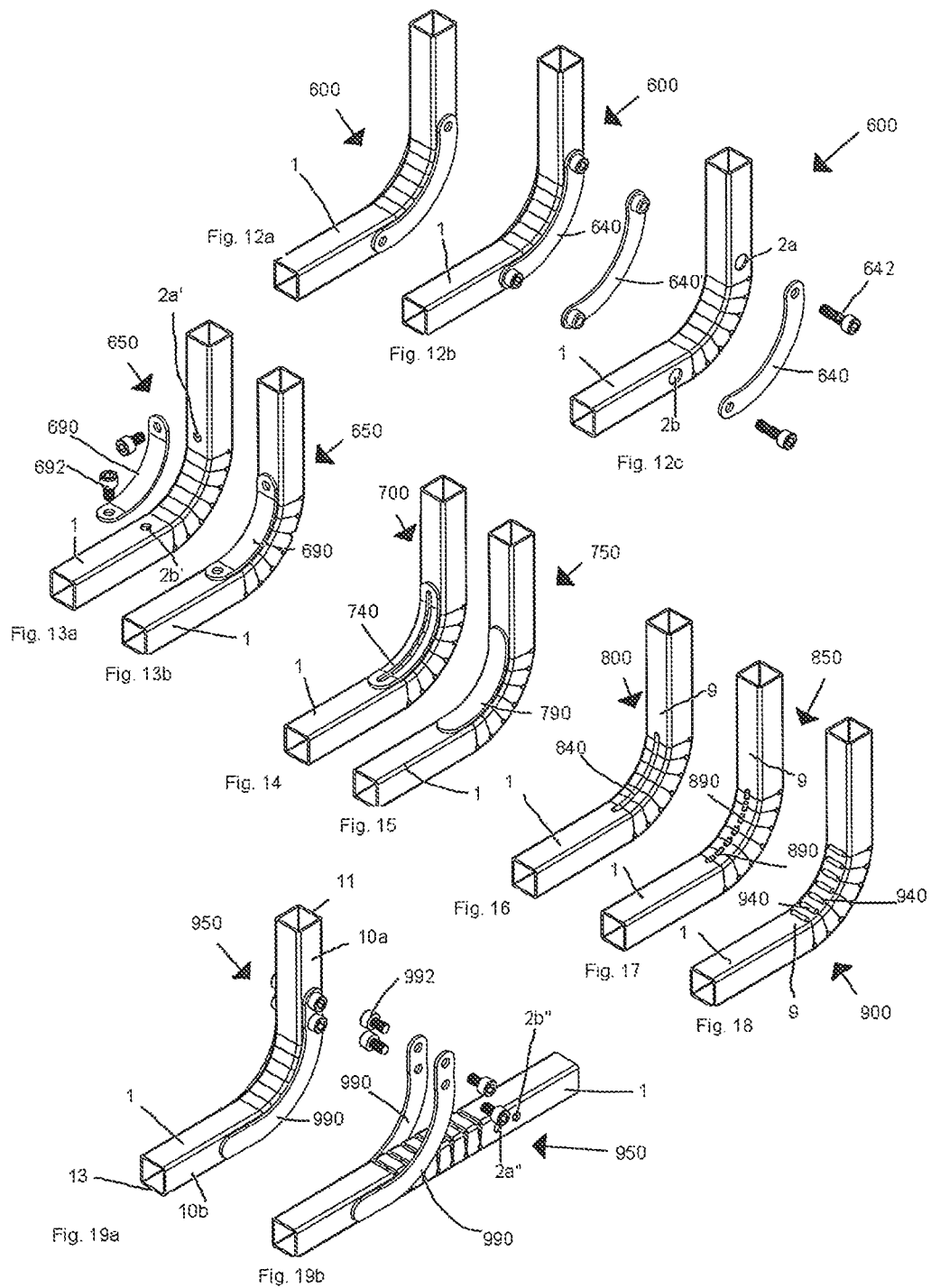

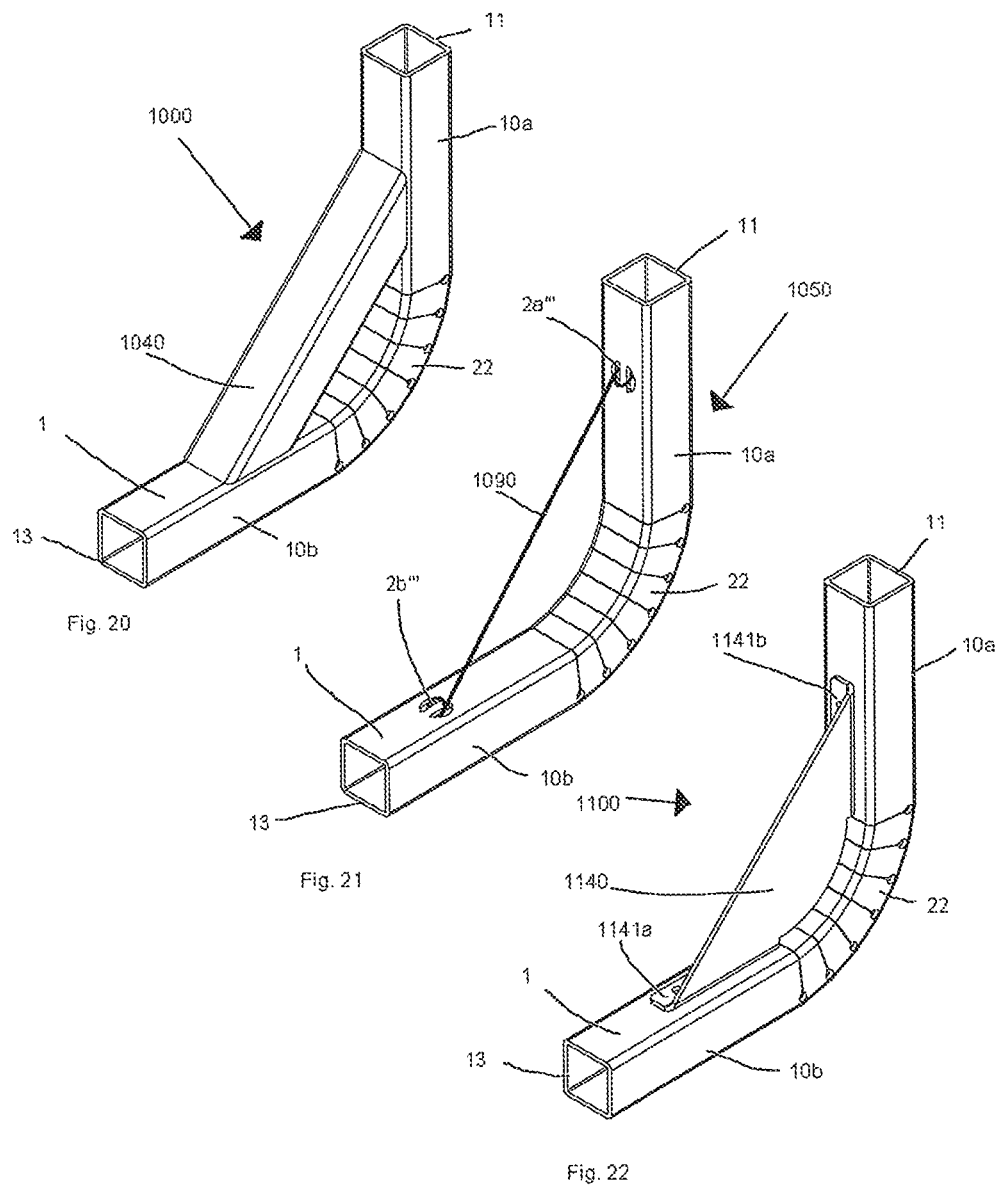

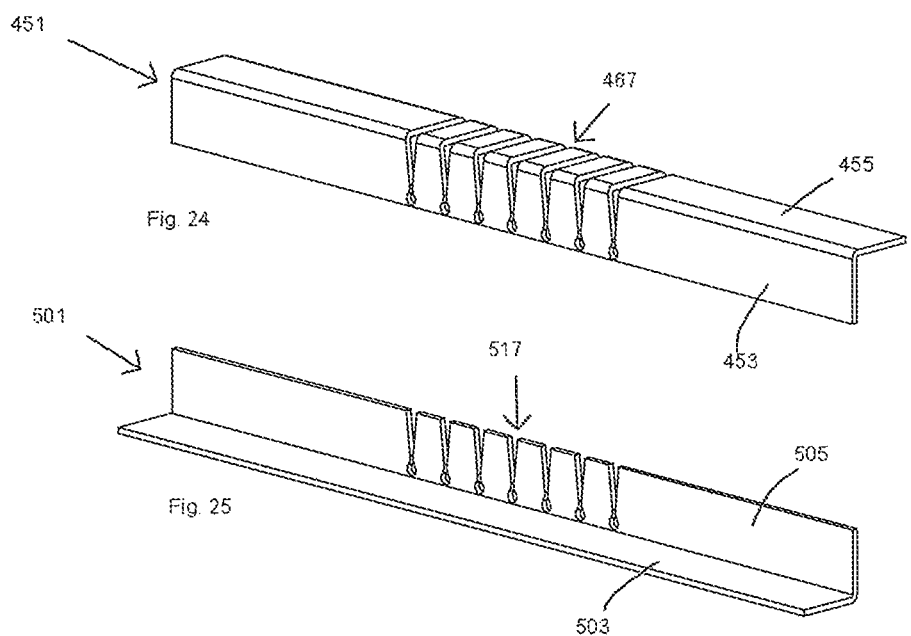

ELONGATE PROFILE, AN ASSEMBLY COMPRISING THE ELONGATE PROFILE AND A METHOD FOR PRODUCING THE ELONGATE PROFILE

BACKGROUND

The invention relates to an elongate profile extending in a longitudinal direction and having a first end and a second end, wherein between the first end and the second end the profile has at least one cutting line forming a cutting pattern for at least one profile section to be removed from the profile, wherein after removal of the at least one profile section from the profile the first end of the profile is bendable towards the second end of the profile and/or vice versa.

The invention further relates to an assembly comprising such a profile. The invention also relates to the use of the profile and/or the assembly and to a method for producing such a profile.

A profile as described above is for example known from FR 2 982 181. The known tubular profile can be bent by means of a series of notches to be cut in the tubular profile. The desired curvature to be made with the tubular profile determines the number and the geometry of a series of notches. Each notch comprises two openings located face to face on the periphery of the tubular profile and the two openings are connected by a recess. After cutting and removing the material located inside the cutting lines for forming the notches it is possible to bend the tubular profile by the deformation of the material. The tubular profile is bendable directly after creating the notches. This direct bendability of the tubular profile may also result in incorrect bending before the actual assembling processes, for example during handling processes, such as during transport or during storage. Such an incorrect bending may damage the tubular profile which may make it unusable.

SUMMARY

This object is achieved with the profile according to claim 1.

The elongate profile extends in a longitudinal direction and has a first end and a second end, wherein between the first end and the second end the profile has at least one cutting line forming a cutting pattern for at least one profile section to be removed from the profile. Preferably, the profile has been cut by a cutting tool providing at least one cutting line forming a cutting pattern for at least one profile section to be removed from the profile. After removal of the at least one profile section from the profile the first end of the profile is bendable towards the second end of the profile and/or vice versa. The profile further comprises at least one separation section. The separation section can be provided by the cutting tool. The at least one separation section is frangible such that in an unbroken state of the separation section the at least one profile section is connected to the profile and in a broken state of the separation section the at least one profile section is disconnected from the profile for removing the at least one profile section from the profile. By means of the separation section connecting the profile section to the profile in an unbroken state, incorrect bending before final assembling can be minimized or even prevented.

The space required for bending the profile is in the unbroken state occupied by the profile section, which is still connected to the profile such that it is difficult or impossible to bend the profile in an incorrect way. In practise the profile section prevents or minimizes the risk that forces experienced during for example transport or storage will damage the profile by undesired bending. Further, the separation section in the unbroken state also minimizes the risk of undesired bending during manufacturing the profiles. The latter increases the output of the machine by minimizing the risk of incorrect manufactured profiles as a result of undesired bended profiles during processing, but also reduces the likelihood that a machine for manufacturing the profiles or a machine part is damaged during processing as a result of an undesired bended profile. At its final destination and at the desired point of time the profile can be bent to its desired curvature. The frangible separation section can be broken for example by an operator's hand or mechanically by a machine using a force that may correspond to a manual force. After breaking the frangible separation section(s) the profile section(s) can be removed from the profile providing the desired space in the profile for bending the profile to its desired curvature. The first end of the profile may be bend and/or twisted towards the second end of the profile and/or vice versa to achieve the desired predetermined curvature and/or the predetermined twist of the profile.

The profile can be manufactured with 3D printing, also known as additive manufacturing (AM).

The curved and/or twisted profile can be used in (temporary) building structures, tents, furniture structures/elements, displays, decorative objects, etc.

The profile may have a number of different shapes such as a profile without any edges, i.e. a cylindrical or round tubular profile. The profile may also have an edge or edges. The profile may have for example two sides with a single edge connecting the two sides, wherein the at least one cutting line is provided in a first side of the profile and/or in a second side of the profile. The profile may also have three sides around its longitudinal axis, for example forming a U-shape in cross-section or a triangle in cross-section, with two or three edges, wherein the at least one cutting line is provided in at least two sides of the profile. The profile may also have four sides forming for example a hollow profile with a rectangular cross-section, wherein the at least one cutting line is provided in three sides of the hollow profile. In the four sided profile with a rectangular cross-section, it is also possible that the at least one cutting line is provided in all four sides of the hollow profile. Instead of a hollow profile it is also possible to use a solid profile.

In one aspect the at least one cutting line has a first end and a second end, wherein the at least one separation section in the profile is provided between the first and the second end of the at least one cutting line. The separation section may be formed by cutting the first and the second end of the at least one cutting line close to each other, for example less than 10 mm. Hence a cutting tool does not have to provide any cuts in the profile to provide the frangible separation section. It is also possible that the thickness of the profile between the two ends of the cutting lines is made smaller to provide the frangible separation section. It is also possible that at least one perforation and/or at least one frangible line is provided in the separation section. The at least one perforation and/or at least one frangible line may be provided by the cutting tool. The distance between the first and the second end of the cutting line may define the number of perforations to be used between the first and the second end of the cutting line. For example, if the distance between the first and the second end of the cutting line is relatively large, for example more than 10 mm, more than one single perforation may be desired to provide the frangible separation section. However, besides the distance between the first and the second end of the cutting line, the number of perforations to be used may also inter alia depend on the material of the profile and its thickness.

The first and the second end of the cutting line may be located on one virtual line with the perforation or the perforations. Such a configuration may facilitate an accurate breaking process and/or may also assure a more predictable break-line which has many advantages and can be preferred for example from an aesthetic perspective of a curved profile or the end product comprising the curved profile.

It is also possible that the at least one profile section is provided by two cutting lines, wherein the separation section is provided between the two cutting patterns provided by the two cutting lines. The separation section can be provided by providing a minimal distance between the ends of the two cutting lines. It is also possible that the separation section comprises one or more perforation(s) between the two cutting patterns or one or more frangible line(s). By breaking the frangible separation section the profile section formed by the two cutting patterns can be removed before initiating the bending process.

For bending or twisting the profile various cutting lines in the profile may provide a number of profile sections. The geometry of the profile sections in the profile may differ with respect to each other depending on the desired curvature and/or the desired twist to be achieved with the bent profile. The cutting lines may also provide corresponding/identical cutting patterns in the profile.

It is further possible that the cutting lines form pairs of cutting lines. The two cutting lines of a pair provide a first cutting line and a second cutting line, wherein, after cutting, the first cutting line and the second cutting line are unconnected to each other and the first cutting line and the second cutting line provide corresponding cutting patterns in a first side of the profile and in a second adjacent or opposing side of the profile. The ends of the pairs of cutting lines may be located in a single side in such a way that the frangible separation sections are located in one straight row extending in the longitudinal direction of the profile between the ends of the pairs of cutting lines such that the separation sections can be broken by a single step simultaneously, for example by using a tool for breaking the separation sections.

The invention also relates to an assembly comprising the above specified profile. The assembly further comprises a fixating element connected or to be connected to the profile, wherein the fixating element is configured to fixate the curved shape of the profile after bending the profile. In such an assembly, the desired end shape of the bended profile can be fixated by means of high speed manufacturing operations in a cost-effective manner by means of the fixating element. In addition, the fixating element may provide additional support such that the assembly can be used in structures exposed to high loads, such as for example a tent structure or a building structure.

In one aspect of the assembly, at least one end portion of the fixating element is fixated to the profile before bending the profile, whereas the second end portion is fixated after bending the profile. This aspect has the advantage that the assembly comprising the profile and the fixating element fixated thereto can be manufactured in one manufacturing site and the bending and fixating processes of the predetermined curvature of the profile by means of fixating the other end of the fixating element can be performed consecutively in another place.

The invention also relates to a method for producing a profile according to any preceding claims, wherein between the first end and the second end the profile is cut for example by a cutting tool, such as a laser, providing:

at least one cutting line forming a cutting pattern for at least one profile section to be removed from the profile, and/or at least one separation section in the profile, wherein the at least one separation section is frangible such that in an unbroken state of the separation section the at least one profile section is connected to the profile and in a broken state of the separation section the at least one profile section is disconnected from the profile.

In addition, the invention relates to a computer program product comprising a readable storage medium, comprising instructions which, when executed on at least one processor, cause the at least one processor to carry out the above method.

Instead of a laser many other machines and processes can be used to provide a profile as specified in this document.

BRIEF DESCRIPTION OF THE DRAWINGS

The invention will now be explained in more detail on basis of exemplary embodiments shown in the appended drawings, in which:

FIGS. 1a-1d show a first embodiment of a hollow profile and the steps to be taken to provide a profile which is ready for a bending process;

FIGS. 2a-2b show a hollow profile as shown in FIG. 1d in a unbent condition and in a bent condition;

FIGS. 3a-3b show a second embodiment of a hollow profile with removed profile sections in a unbent condition and in a bent condition;

FIGS. 4a-4b show a third embodiment of a hollow profile with removed profile sections in a unbent condition and in a bent condition;

FIGS. 8a-8c show a sixth embodiment of a hollow profile in a unbent condition and in a bent condition;

FIG. 9a-9d show an seventh embodiment of a hollow profile with a single removed profile section in a unbent condition;

FIG. 10 shows a first embodiment of an assembly comprising the hollow profile shown in FIG. 9d provided with a hole and a first variant of a fixating element to be connected to the profile;

FIGS. 11a-11b show a second embodiment of an assembly comprising the hollow profile shown in FIG. 10 in a bent and unbend condition, wherein the hollow profile is combined with a second variant of the fixating element;

FIG. 12a-22 show various further embodiments of an assembly using as a basis the profile shown in FIG. 1d;

FIG. 24 shows a ninth embodiment of a hollow profile with removed profile sections in a unbent condition;

FIG. 25 shows a tenth embodiment of a hollow profile with removed profile sections in a unbent condition.

Like parts are indicated by the same numerals/signs in the various figures.

DETAILED DESCRIPTION OF VARIOUS EMBODIMENTS

Figures 5A, 5B:
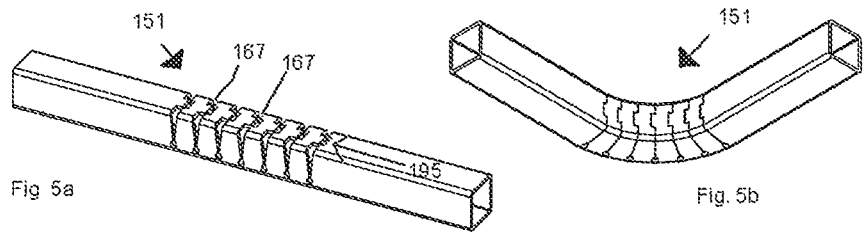
FIGS. 5a-5b show a third embodiment of a hollow profile with removed profile sections in a unbent condition and in a bent condition.

FIGS. 1a-1d show a first embodiment of a hollow profile 1 and the steps to be taken to provide a profile 1 such as shown in FIG. 1d which is able to be bent from an unbent condition (see FIGS. 1a-1d, 2b) to a predetermined curvature of the profile in a bent condition (see FIG. 2a).

As shown the elongate hollow profile 1 has four sides 3, 5, 7, 9 which in a cross-section form a rectangle, in particular a square. The elongate profile 1 extends in a longitudinal direction between a first end 11 and a second end 13.

Between the first end 11 and the second end 13 the elongate profile 1 has been cut by a cutting tool (not shown) providing seven identical cutting lines 14 in a first side 3 and a second side 5 of the profile 1 and seven identical cutting lines 15 in a second side 5 and a third side 7 of the profile 1. The cutting lines 14, 15 form fourteen cutting patterns, i.e. seven cutting patterns in the first side 3 and the second side 5 of the profile 1, and seven cutting patterns in the second side 5 and the third side 7 of the profile 1. A pair of cutting lines 14, 15 is formed by two opposing cutting lines which provide one profile section 17. The profile 1 has seven profile sections 17 in total. The profile sections 17 define the predetermined curvature of the profile 1 in a bent condition (see FIG. 2a).

Depending on the desired end curvature of the profile more or less profile sections can be provided. Further, it is possible that the profile sections in one single profile are not identical (not shown) to provide a specific curvature or twisted state of the profile.

The profile 1 further comprises separation sections 20 provided by the cutting tool (not shown). In FIG. 1a an enlarged view identified with A is shown separately to show the profile portion 17 comprising the separation section 20 in more detail. The enlarged view identified with B shows a second embodiment of the separation section 20'.

The profile section 17 is provided by the pair of cutting lines 14, 15, wherein the separation section 20 is provided between the two cutting patterns provided by the two cutting lines 14, 15. The profile 1 comprises seven pairs of cutting lines 14, 15. Each pair has a first cutting line 14 and a second cutting line 15, wherein, after cutting, the first cutting line 14 and the second cutting 15 line are unconnected to each other. Further, the first cutting line 14 and the second cutting line 15 provide corresponding cutting patterns in a first side 3 of the profile 1 and in an opposing third side 7 of the profile 1. The ends of the pairs of cutting lines 14, 15 are located in the second side 5 of the profile in such a way that the separation sections 20 are located in a row in the longitudinal direction of the profile 1 between the ends of the pairs of cutting lines 14, 15 such that the seven frangible separation sections 20 can be broken in a single step. The portions of the cutting lines 14, 15 located in the second side 5 of the profile 1 extend in a direction substantially perpendicular to the longitudinal direction of the elongate profile 1.

The separation section 20 comprises two parallel frangible lines 16a, 16b provided by the cutting tool, wherein each frangible line 16a, 16b extends between the ends of each cutting line 14, 15. Each frangible line 16a, 16b extends in the longitudinal direction of the profile 1. The frangible lines 16a, 16b have the same length. The parallel frangible lines 16a, 16b provide a predictable and consistent breaking pattern in the profile 1 such that the frangible separation section 20 is broken without any other parts of the profile 1.

The profile section 17' as shown in the enlarged view B is provided by a single cutting line 18. The cutting line 18 has a first end 18a and a second end 18b, wherein the separation section 20' in the profile 1 is provided between the first 18a and the second end 18b of the cutting line 18. The separation section 20' comprises a perforation 22. The first 18a and the second end 18b of the cutting line 18 are located on one virtual line with the perforation 22 to provide a predictable break-line disconnecting the profile section 17' from the profile 1.

Instead of a single perforation as shown in enlarged view B, it is also possible to use a number of perforations (not shown) to provide a separation section. Further, it is possible that the separation section (not shown) is provided without perforations 22 or frangible lines 16a, 16b. For example, the separation section (not shown) can be provided by a minimal distance between the ends of the two opposing cutting lines 14, 15 in the second side 5, or by a minimal distance between the ends 18a, 18b of the cutting line 18. Such a minimal distance is for example less than 10 mm or preferably less than 5 mm.

As indicated by the arrows I in FIG. 1b it is also possible to provide additional cuts (not shown) between a single cutting line 14, 15, 16. These additional cuts facilitate the removal step of the disconnected profile sections 17, 17'. These cuts break each profile section 17, 17' in smaller pieces which can be removed from the profile 1 more easily, and prevent that disconnected profile sections 17, 17' remain stuck in the profile 1.

The separation section 20, 20' is frangible. In an unbroken state of the separation section the at least one profile section 17, 17' is connected to the profile 1 and in a broken state of the separation section 20, 20' the at least one profile section 17, 17' is disconnected from the profile 1 such that it is possible to remove the profile section 17, 17 from the profile 1.

The seven frangible separation sections 20, 20' of the profile 1 can be broken in one single step, for example by using a tool 35 (see FIGS. 1b and 1c) comprising a number of sharp points 36 for breaking the separation sections 20, 20'. After disconnecting the seven profile sections 17, 17' from the profile 1 by the tool 35 and simultaneously or consecutive removing the seven profile sections 17, 17' from the profile 1, it is possible to bend the profile 1. The bendable profile is shown in FIG. 1d. By bending the first end 11 of the profile 1 towards the second end 13 of the profile 1 and/or vice versa a bent profile 1 can be obtained as shown in FIG. 2a.

The FIGS. 3a-8c show a number of profiles 51; 101; 151; 201; 251; 301 in an unbent condition and in a bent and/or twisted condition. The profiles 51; 101; 151; 201; 251; 301 have different cutting lines providing different shaped cutting patterns and different shaped (and removed) profile sections for bending or twisting the profiles 51; 101; 151; 201; 251; 301 in a predetermined curvature and/or predetermined twisted state.

In the FIGS. 3a-7b and 8c the profiles 51; 101; 151; 201; 251; 301 are shown after removing the profile sections from the profile by means of a frangible separation section configured for example as shown with the enlarged views A and B in FIG. 1a. The removed profile sections have been identified with reference signs 17; 67; 117; 167; 217a, 217b; 267a, 267b in FIGS. 2b-7a. FIGS. 8a and 8b show a profile 301 having a single (frangible) profile section 317. In FIG.

8*a* the profile section 317 is shown in an unbroken state, wherein the profile section 317 is connected to the profile 1 by means of the separation section 320, 320'. FIG. 8*b* shows the profile section 317 in a broken and removed state, such that the profile 301 can be bent. FIG. 8*c* shows the profile 301 in a bent condition. The profile 301 is configured to bend the first end 311 towards and against and on the second end 313 of the profile 301.

Figures 6A, 6B:
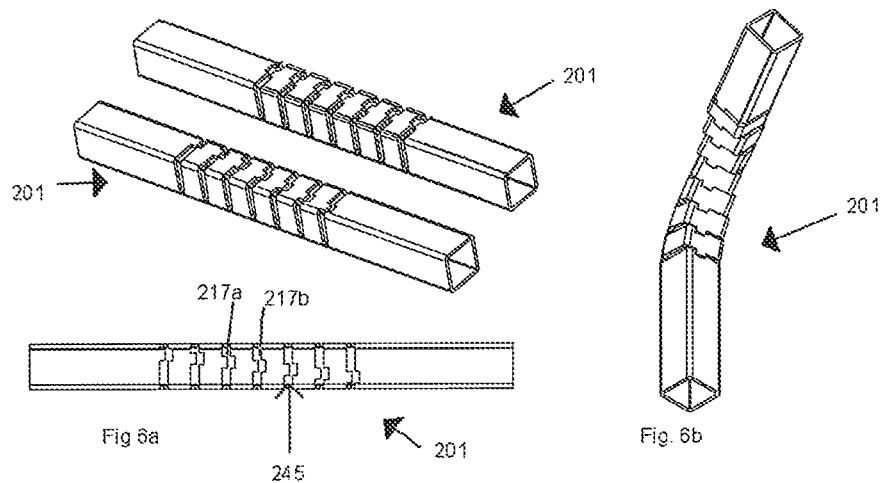
FIGS. 6a-6b show a fourth embodiment of a hollow profile with removed profile sections in a unbent condition and in a bent and twisted condition.
Figures 7A, 7B:
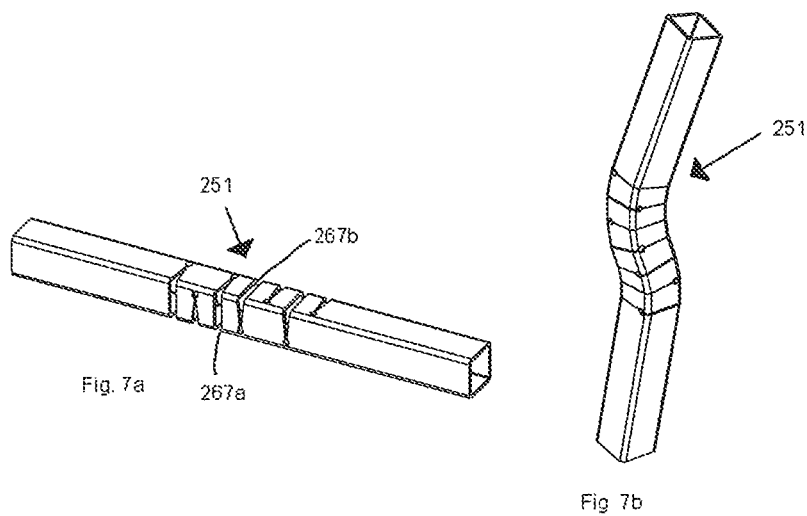
FIGS. 7a-7b show a fifth embodiment of a hollow profile with removed profile sections in a unbent condition and in a bent and twisted condition.

FIGS. 1*d*-5*b* show cutting lines providing corresponding/identical cutting patterns and identical removed profile sections 17; 67; 117; 167 in each of the profiles 1; 51; 101; 151 shown. The tongue-recess configuration 195; 245 of the profiles 151; 201 shown in FIGS. 5*a*-6*b* provides an additional locking function against undesired twisting in a direction around the virtual center axis of the profile 151; 201. As shown in FIGS. 6*a* and 6*b* or in FIGS. 7*a* and 7*b* the geometry of the profile sections in the profile 201; 251, see for example removed profile section 220*a*; 270*a* and 220*b*; 270*b*, differ with respect to each other to create the desired curvature and/or the desired twist in the bent and twisted profile 201; 251 (FIGS. 6*b* and 7*b*).

FIG. 9*a-d* show a seventh embodiment of the profile 351. Like the second embodiment of the profile 51 shown in FIGS. 3*a* and 3*b*, the profile 351 has at least one cutting line provided in four sides of the hollow profile 5; 351 to provide a profile 51 with the (removed) profile sections 67 or a profile 351 with a single profile section 367. The FIGS. 9*b* and 9*c* show two embodiments of a frangible separation section 370; 370 located between the ends of the cutting line 36. The frangible separation section 370 comprises a single frangible line 366. The frangible separation section 370' comprises a perforation 370'. An operator can disconnect and remove the frangible separation section 370; 370' by hand or with a tool (a hand tool such as screw driver) before bending the profile 351 to its curvature determined by the geometry of the removed single profile section 367. FIGS. 10 and 11*a*-11*b* show an assembly 500; 550 comprising the profile 351 shown in FIGS. 9*a*-9*d* and a pair of fixating elements 540; 590. The profile 351 is provided with a hole 352. After bending the profile 351 to its predetermined curvature the fixating elements 540; 590 are used to fixate the bent profile as shown for example in FIG. 11*b*. The fixating elements 540 use a fastener (not shown in FIGS. 10-11*b*) through the hole 352 and the holes 541 to connect the upper portion 360*a* of the profile between the fixating elements 540 and one or two fasteners through holes 543, 545 to connect the lower portion 360*b* of the profile 351 to the fixating elements 540. The at least one fastener for fixating the lower portion 360*b* will be drilled through the wall of the profile 351. The fixating elements 590 also use a fastener through the hole 352 and the holes 591 to connect the upper portion 360*a* of the profile between the fixating elements 590 after bending the profile 351. End portions 593 of the fixating elements 590 opposite to end portions provided with a hole 591 are welded to the lower portion 360*b* before bending the profile 351.

FIG. 12*a*-22 show various further embodiments of an assembly 600; 650; 700; 750; 800; 850; 900; 950 using as a basis the profile 1 shown in FIG. 1*d* in combination with various fixating elements 640, 640'; 690; 740; 790; 840; 890; 940; 990; 1040; 1090; 1040. For fixating the various fixating elements 640, 640'; 690; 740; 790; 840; 890; 940; 990; 1040; 1090; 1040 the profile 1 can be provided with holes 2*a*, 2*b*; 2*a'*, 2*b'*; 2*a"*, 2*a"* for fasteners 642; 692; 992 or openings 2*a'''*, 2*b'''* or without any holes/openings.

The various fixating elements shown in FIGS. 12*a*-22 for fixating the desired curved shape of the profile 1 can be grouped as follows:

curved fixation plate(s) 640, 640'; 690; 740; 790; 990 connected to or to be connected on outer wall(s) of the profile 1 by fasteners or by a welding process;

welds 840; 890; 940 provided by a welding process on at least the fourth side 9 of the profile 1 which side 9 forms an inner side of bend of the curved profile 1;

a support element 1040; 1090; 1140 for connecting a first upper portion 10*a* of the profile 1 located between the bent portion 22 of the profile 1 and the first end 11 of the profile 1 with a second portion 10*b* of the profile 1 located between the bent portion 22 of the profile 1 and the second end 13 of the profile 1. The support element is a linear profile section 1040 as shown in FIG. 20 or a rope/cable 1090 as shown in FIG. 21 connected by means of the openings 2*a'''*, 2*b'''* to the profile 1, or a plate 1140 provided with connection flanges 1141*a*; 1141*b* on its ends to be connected to the first 10*a* and second portion 10*b* of the profile 1 as shown in FIG. 22.

In practise, it is preferred that at least one end portion of the fixating element 640; 690; 990; 1040; 1090; 1140 is fixated or attached to the profile 1 before bending the profile, whereas a second end portion of the fixating element 640; 690; 990; 1040; 1090; 1140 is fixated after bending the profile 1.

Figure 23A:
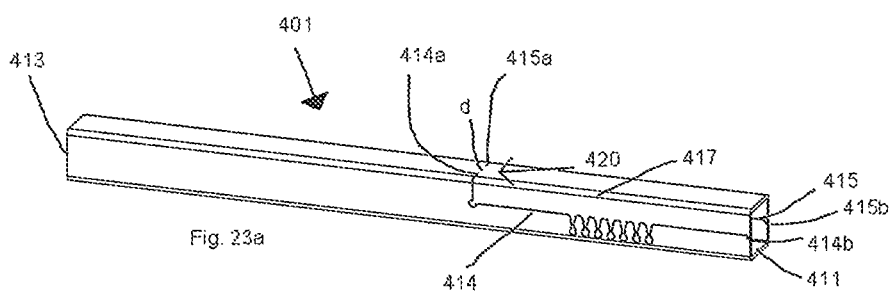
FIG. 23a-23c show an eight embodiment of a hollow profile with a single profile section in a unbent condition and in a bent condition.
Figure 23B:
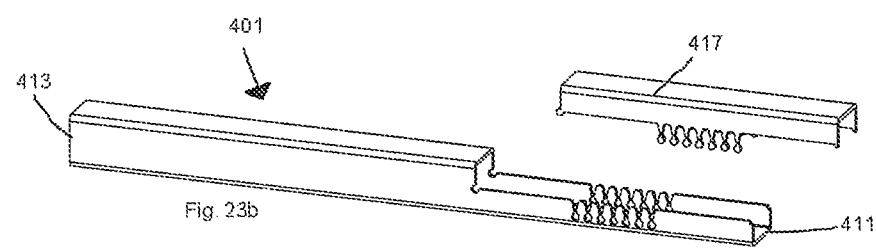
Figure 23C:
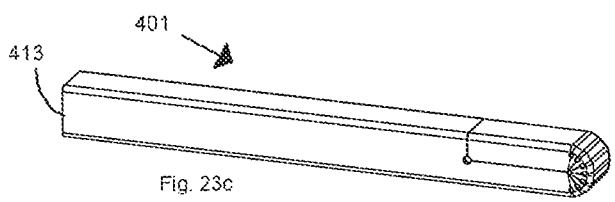

FIG. 23*a-c* show an eight embodiment of a hollow profile 401. The profile 401 has a profile section 417. The profile section 417 is not provided in the middle of the elongate profile between its ends 411, 413 as shown in the FIGS. 1*a*-22, but the profile section 417 is provided adjacent the end 411 of the profile 401. The single profile section 417 is provided by two cutting lines 414, 415. Each cutting line 414, 415 has an end 414*a*, 415*a* located close to the middle of the unbent profile and an end 414*b*, 415*b* located in the end 411 of the profile 401. The ends 414*a*, 415*a* of the two cutting lines 414, 415 are located a minimal distance d away from each other. This minimal distance d is for example 1-10 mm, more preferably 1-5 mm. The frangible separation section 420 of the profile 401 is the profile wall portion between the ends 414*a*, 415*b*. In an unbroken state of the separation section 420 the at least one profile section 417 is connected to the profile 401 and in a broken state of the separation section 420 the profile section 417 is disconnected from the profile for removing the profile section 417 from the profile. FIG. 23*b* shows the step of removing the disconnected profile section 417 from the profile 401. After removing profile section 417, it is possible to bend the first end 411 of the profile towards the second end 413 such that the (remaining of the) first end is positioned on a section of the profile cut by the cutting lines 414, 415.

FIGS. 24 and 25 show further embodiments of the profile 451; 501 which has two sides 453, 455; 503, 505 which extend perpendicular to each other. The at least one cutting line for providing one of the removed profile sections 467 is provided in the two sides 453, 455 of the profile 451. The at least one cutting line for providing one of the removed profile sections 517 is provided in a single side 505 of the profile 501.

The profile (not shown) may also have three sides around its longitudinal axis, for example forming a U-shape in cross-section or a triangle in cross-section, with two or three edges, wherein the at least one cutting line is provided in at least two sides of the profile.

The profile can be made of metal, wood, plastic, ceramic, and/or composites including fibre reinforced composites.

An elongate hollow profile extending in a longitudinal direction and having a first end and a second end, wherein the profile comprises at least three sides forming at least three edges extending in a longitudinal direction, wherein the profile has been cut by a cutting tool providing at least one cutting line forming a cutting pattern for at least one profile section to be removed from the profile, wherein after removal of the at least one profile section from the profile the first end of the profile is bendable towards the second end of the profile and/or vice versa, wherein the at least one cutting line has been cut in all the sides of the profile. Preferably, this cutting line has been cut through all the edges of the profile. Preferably, the profile has four sides which in a cross-section form a rectangle/a square. Such a profile can be combined with the features disclosed in this specification such as for example but not limited to the frangible separation section as disclosed in this document.

The invention claimed is:

1. An elongate profile extending in a longitudinal direction and having a first end and a second end,
    wherein between the first end and the second end the profile has at least one cutting line forming a cutting pattern for at least one profile section to be removed from the profile, wherein the profile has at least three planar sides, including a first side, a second side, and a third side, wherein a first edge extends between the first side and the second side, and a second edge extends between the second side and the third side, and the at least one cutting line is provided in the at least three sides of the profile and the first edge and the second edge;
    wherein after forming the cutting pattern the profile further comprises at least one separation section, the at least one separation section is frangible by breaking such that in an unbroken state of the separation section the at least one profile section is connected to the profile and in a broken state of the separation section the at least one profile section is disconnected from the profile for removing the at least one profile section from the profile wherein after removal of the at least one profile section from the profile the first end of the profile is bendable towards the second end of the profile and/or vice versa.

2. The profile according to claim 1, wherein the profile has four sides and a hollow interior.

3. The profile according to claim 1, wherein the at least one cutting line has a first end and a second end;
    wherein the at least one separation section in the profile is provided between the first and the second end of the at least one cutting line.

4. The profile according to claim 1, wherein the at least one profile section is provided by two cutting lines;
    wherein the separation section is provided between the two cutting patterns provided by the two cutting lines.

5. The profile according to claim 4, wherein the two cutting lines provide two corresponding cutting patterns in the profile.

6. The profile according to claim 4, wherein the two cutting lines provide a first cutting line and a second cutting line;
    wherein, after cutting, the first cutting line and the second cutting line are unconnected to each other and the first cutting line and the second cutting line provide corresponding cutting patterns in the first side of the profile and in the second side.

7. The profile according to claim 1, wherein various cutting lines in the profile provide a number of profile sections.

8. The profile according to claim 1, wherein the separation section comprises at least one perforation.

9. The profile according to claim 1, wherein the separation section comprises one or more frangible lines.

10. The profile according to claim 9, wherein the separation section comprises two frangible lines that extend substantially parallel to each other.

11. An assembly comprising a profile according to claim 1, wherein the assembly further comprises a fixating element connected or to be connected to the profile;
    wherein the fixating element is configured to fixate the curvature of the profile after bending the profile.

12. The assembly according to claim 11, wherein the fixating element for fixating the desired curved shape of the profile is selected from the group consisting of:
    a curved fixation plate connected to or to be connected on an outer wall of the profile;
    welds provided by a welding process;
    a rope or a cable for connecting a first portion of the profile located close to the first end of the profile with a second portion of the profile located close to the second end of the profile;
    a linear support element connecting a first portion of the profile located close to the first end of the profile with a second portion of the profile located close to the second end of the profile.

13. The assembly according to claim 11, wherein at least one end portion of the fixating element is fixated to the profile before bending the profile, whereas a second end portion can be fixated to the profile after bending the profile.

14. A method for producing a profile according to claim 1, wherein between the first end and the second end the profile is cut:
    at least one cutting line forming a cutting pattern for at least one profile section to be removed from the profile, and/or
    at least one separation section in the profile, wherein the at least one separation section is frangible such that in an unbroken state of the separation section the at least one profile section is connected to the profile and in a broken state of the separation section the at least one profile section is disconnected from the profile.

15. The method according to claim 14, wherein the profile is cut by a cutting tool.

16. A computer program product comprising a readable storage medium, comprising instructions which, when executed on at least one processor, cause the at least one processor to carry out the method of claim 14.

17. The profile according to claim 1, wherein the profile has four sides and a hollow interior;
    wherein the at least one cutting line is provided in the four sides of the hollow profile.

18. The profile according to claim 1, wherein after forming the cutting pattern the profile further comprises at least one separation section in at least one of the three sides of the profile.

19. The profile according to claim 1, wherein after forming the cutting pattern the profile further comprises at least one separation section in at least one of the three sides of the profile, wherein the at least one separation section extends between edges defining the side of the profile.

20. An assembly comprising an elongate profile extending in a longitudinal direction and having a first end and a second end, wherein between the first end and the second end the profile has at least one cutting line forming a cutting pattern for at least one profile section to be removed from the profile, wherein the profile has three sides and the at least one cutting line is provided in at least two sides of the profile;

wherein after forming the cutting pattern the profile further comprises at least one separation section, the at least one separation section is frangible by breaking such that in an unbroken state of the separation section the at least one profile section is connected to the profile and in a broken state of the separation section the at least one profile section is disconnected from the profile for removing the at least one profile section from the profile wherein after removal of the at least one profile section from the profile the first end of the profile is bendable towards the second end of the profile and/or vice versa;

wherein the assembly further comprises a fixating element connected or to be connected to the profile;

wherein the fixating element is configured to fixate the curvature of the profile after bending the profile, wherein the fixating element for fixating the desired curved shape of the profile is selected from the group consisting of:

a curved fixation plate connected to or to be connected on an outer wall of the profile;

welds provided by a welding process;

a rope or a cable for connecting a first portion of the profile located close to the first end of the profile with a second portion of the profile located close to the second end of the profile;

a linear support element connecting a first portion of the profile located close to the first end of the profile with a second portion of the profile located close to the second end of the profile; and wherein the linear support element is a rod-like structure or a plate provided with connection flanges on its ends to be connected to the first and second portion of the profile.

\* \* \* \* \*